United States Patent [19]

Bellingham

[11] 4,040,315
[45] Aug. 9, 1977

[54] MACHINING CROSS-FEED HEAD COUNTERWEIGHT SYSTEM

[75] Inventor: Robert Aldred Bellingham, Southfield, Mich.

[73] Assignee: The Valeron Corporation, Oak Park, Mich.

[21] Appl. No.: 688,957

[22] Filed: May 24, 1976

[51] Int. Cl.² .......................... B23B 3/00; B23B 3/04
[52] U.S. Cl. ........................................... 82/2 E; 82/63
[58] Field of Search .................................... 82/2 E, 63

[56] References Cited

U.S. PATENT DOCUMENTS

| | | | |
|---|---|---|---|
| 2,112,396 | 3/1938 | Corrigan | 82/63 |
| 2,476,255 | 7/1949 | Berthiez | 82/2 E X |
| 2,593,124 | 4/1952 | Eaton | 82/63 X |
| 2,901,935 | 9/1959 | Kellev, Jr. et al. | 82/2 E |
| 3,620,109 | 11/1971 | Durr et al. | 82/2 E |
| 3,739,666 | 6/1973 | Wright et al. | 82/2 E |

FOREIGN PATENT DOCUMENTS 226,728  8/1943  Switzerland .......................... 82/2 E Primary Examiner—Harrison L. Hinson

[57] ABSTRACT

A rotary machining head having a pair of dynamically balanced cross-feed slides with tool blocks mounted thereon for radial cross-feed machining each, provided with a counterweight including a lost motion connection and a stop limiting the counterweight's radially outward movement to provide a partial counterbalancing of the centrifugal force operating on each of the tool blocks resisting radially inward feed. The lost motion connection permits the tool block to continue radial inward movement without counterweight effect, the stop being adjustable to arrest counterweight effect before any weight shift across the center line occurs.

7 Claims, 5 Drawing Figures

MACHINING CROSS-FEED HEAD COUNTERWEIGHT SYSTEM

BACKGROUND OF THE INVENTION

Machining tool heads employing cross-feed slides are conventionally dynamically balanced through use of equal and opposite tool blocks mounted on cross slides effecting simultaneously radial feed of cutters mounted thereon. When the cross slides are in their extreme outermost position, normally at the start of the operation, and with the head rotating at high speed, resulting centrifugal force on the individual tool blocks must be overcome to feed the blocks radially inward. With a central draw bar, such as one actuated through crank linkage to simultaneously feed the tool blocks radially inward, the draw bar force involved has limited feasible rotational speeds and head diameters from those which could otherwise be employed. Excessive power for actuating the draw bar may otherwise be required which may be unavailable or cause damage or excessive wear to the actuating linkage.

If the slide were constructed with a fixed counterweight effective to substantially reduce the net centrifugal force resisting inward feed, a problem of weight shift across the centerline and frequently resulting tool mark would result when the radially inward movement of the tool block progresses beyond the balance point of relative centrifugal forces.

SUMMARY OF THE INVENTION

A significant reduction in actuating force for moving the tool block inwardly from its outermost position with resulting benefits of significantly increased feasible rotational operating speeds and machining head diameters has been found possible by providing a counterweight connected to the cross feed slide on the opposite side of the center line for each tool block which will reduce the net effect of centrifugal force resisting inward movement of the tool block during a portion of its radially inward travel where the centrifugal forces are highest and by providing a stop, together with a lost motion connection, which becomes effective to eliminate the counterweight force acting on the cross slide before it can overbalance the decreasing centrifugal force on the tool block such as to cause a weight shift and tool mark in the workpiece surface. Adjustment means is provided for the counterweight stop to compensate for the various types of tool cartridges which may be mounted on the tool block.

DESCRIPTION OF THE DRAWINGS:

FIG. 3 is a fragmentary end view of cross-feed slides illustrated in FIGS. 1 and 2.

Figure 1:
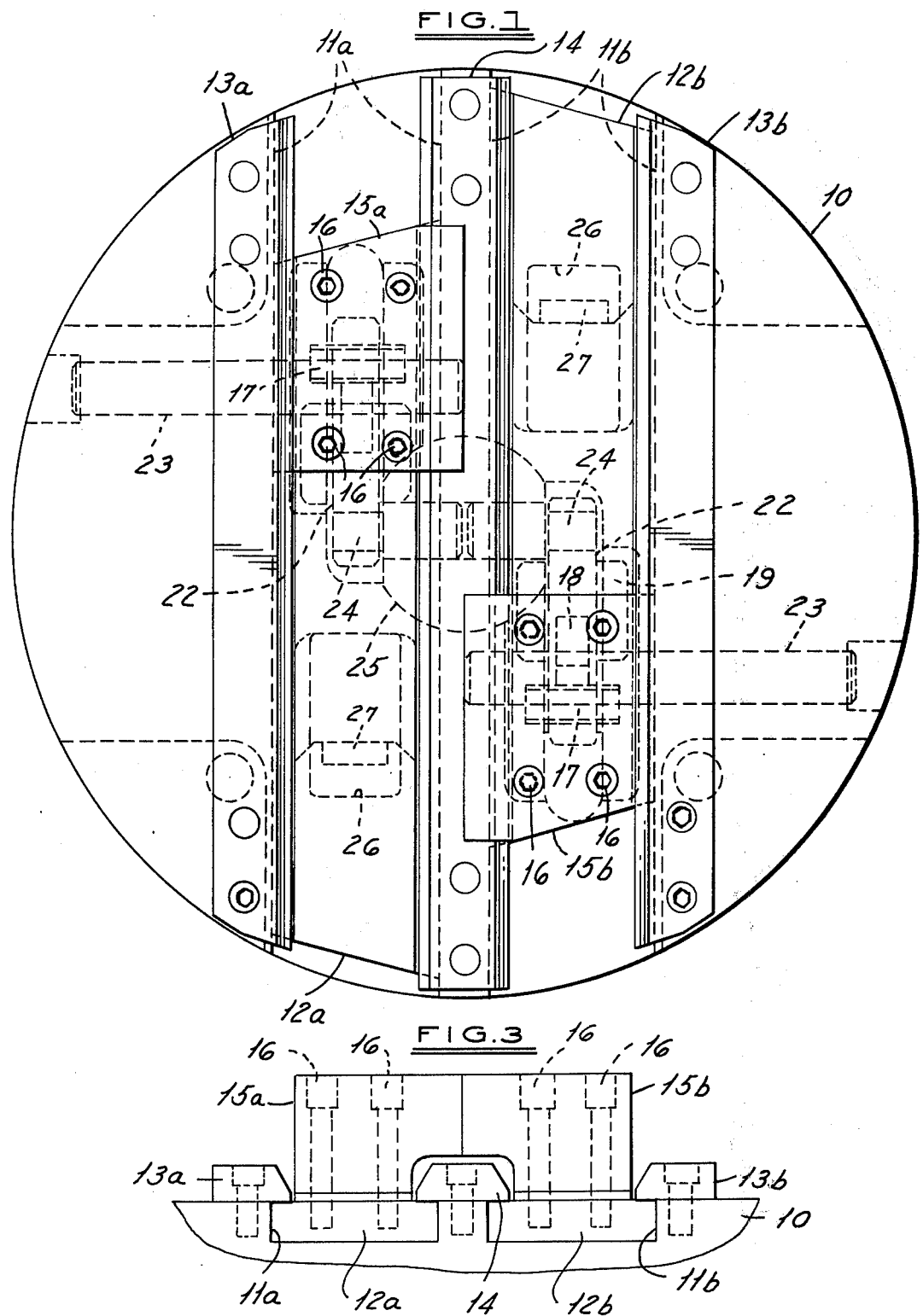
FIG. 1 is an end elevation of a cross feed head embodying the present invention.

DESCRIPTION OF THE EMBODIMENT:

Referring to FIG. 1, the annular tool body 10 is provided with a pair of cross feed slide ways 11a and 11b for mounting a pair of cross slides 12a, 12b retained by a pair of slide covers 13a and 13b and a common center cover 14. Each of a pair of tool blocks 15a, 15b is rigidly anchored to the cross slide by four suitable socket head screws 16 and is accurately located by a step key 17 for distance from center and a separate cross key 18 for position transverse to the slide. The tool blocks 15 may be adapted to mount any suitable cutting tool, preferably standard cartridges with indexable tungsten carbide inserts, such cartridges and inserts per se forming no part of the present invention.

Figure 2:
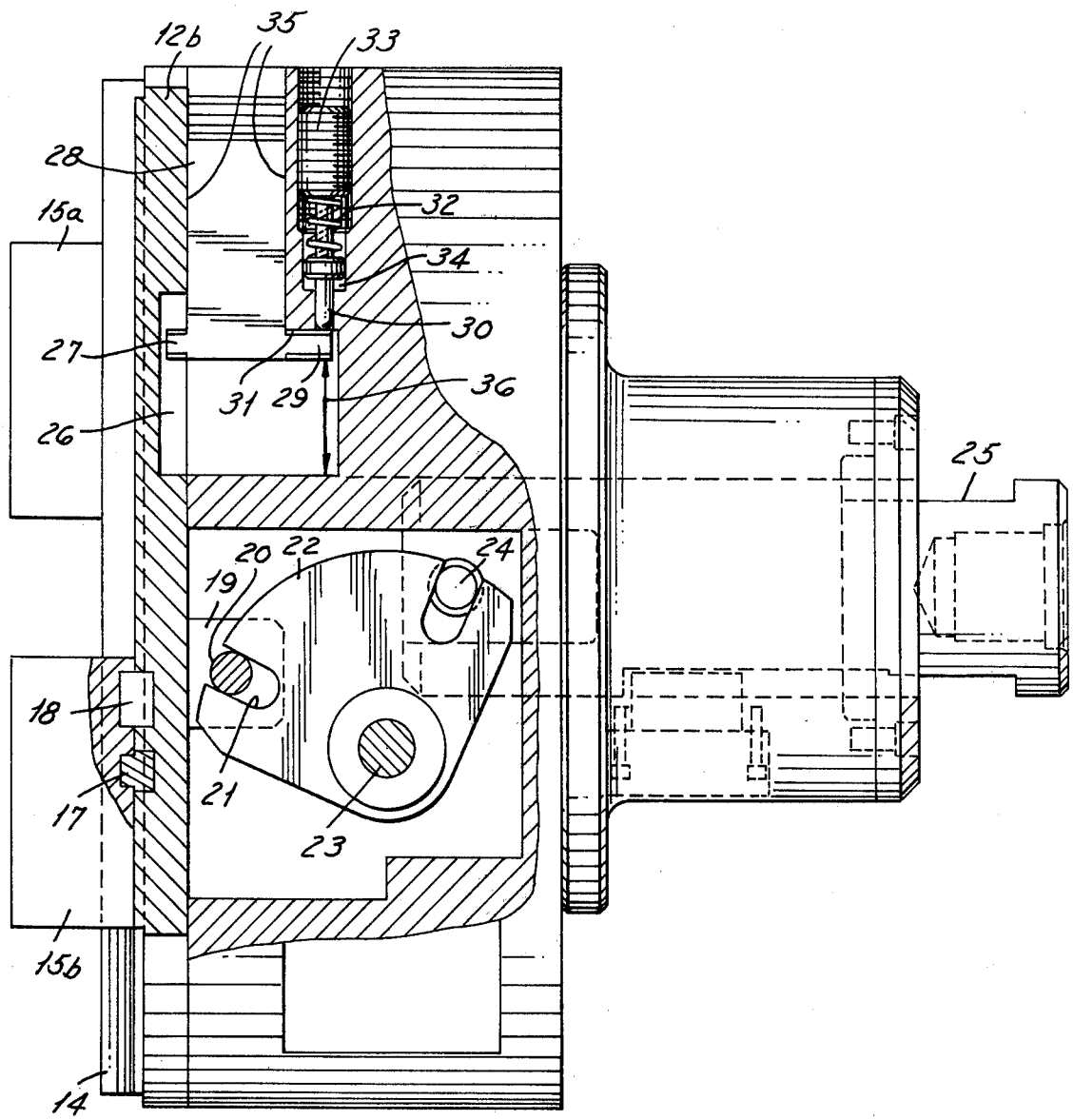
FIG. 2 is a partially sectional side elevation of such head.
Figure 4:
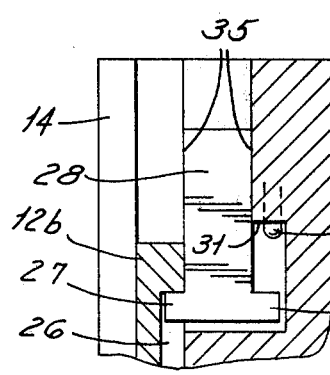
FIG. 4 is a fragmentary view of the counterweight illustrated in FIG. 2 showing its position at the radial outermost position of the tool block.
Figure 5:
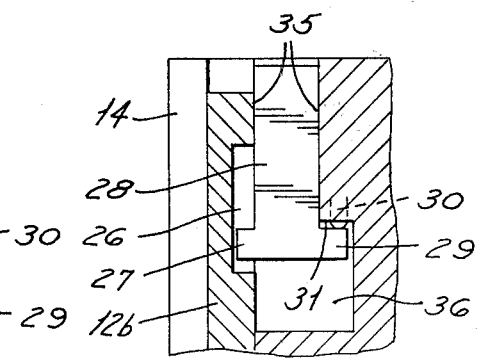
FIG. 5 is a view similar to FIG. 4 corresponding to the radially innermost position of the tool block.

Each slide includes a depending drive lug 19 having a projecting drive pin 20 for engagement within a slot 21 of a crank 22 mounted on an axle 23 seated in the body 10 as best shown in FIG. 1. Each crank is actuated by a drive pin 24 projecting from a common draw bar 25 adapted to simultaneously actuate both slides from the fully extended position fragmentally shown in FIG. 4 to the fully retracted position fragmently shown in FIG. 5. Each slide passing through the transition stage shown in FIG. 2 includes an extension having a lost motion slot 26 engaged by a lug 27 projecting from a counterweight 28 having another projecting stop lug 29 adapted to engage an adjustable stop pin 30 or stop wall 31 to limit the weight's effective radial movement. The stop pin 30 is resiliently loaded by spring 32 reacting against adjustment screw 33, the operation of which is to provide a spring load bias on the stop pin 34 having a transition cushioning effect as well as adjustable positioning of the limit of stop pin travel within the clearance range 34 between the head of the stop pin 30 and the adjacent wall of the body. Each counterweight 28 is guided by a slot 35 provided in the body and is free to travel within the clearance range 36 under the control of the slide engaging lug 27 and stop lug 29. The tool blocks 15a, 15b are diametrically positioned for equal and opposite movement on opposite sides of the center line of the rotatable tool body and are dynamically balanced for high speed rotation in performing cross feed machining operations. The counterweights 28 located on opposite sides of the tool axis from the associated tool block thus counteract a substantial portion of the centrifugal weight of each tool block from its radially outermost position, as shown in FIG. 4, during radially inward movement of the tool block until counterweight stop projection 29 engages the adjustable stop pin 30 or stop wall 31 limiting the radially outward travel of such counterweight.

The weight is calibrated to counteract a substantial portion of the centrifugal force operating on the tool block in its radially outward positions (e.g., 60 percent at the outermost extreme) where high speed rotation develops a substantial centrifugal force opposing retraction through the draw bar 25 and until the tool block reaches a radially inward position at which time the centrifugal force is reduced to the point that the counterweight is no longer required. At this point, the adjustable stop is set to stop the counterweight travel after the cushioning compression of the spring 32 and the cross slide continues to travel radially inward without the aid of the counterweight. The stop position of the counterweight is selected to precede any possible overbalancing of the centrifugal force which might otherwise cause a weight shift across the center line and tool mark on the work piece associated therewith.

With this system substantially higher rotational speeds (e.g. in excess of 500 rpm) are possible with substantially greater cross-feed diameters and substantially reduced draw bar loading as compared to previous cross-feed tools which do not incorporate such limited counterweight feature.

I claim:

1. A machining cross-feed head comprising;

a rotary body, parallel cross slide means on opposite sides of rotational center of said body, each with a tool block for mounting a cutting tool, means for simultaneously feeding said tool blocks radially across said body, individual counterweight means having a connection with each tool block cross slide operative to reduce the effective centrifugal force on said tool blocks through at least a portion of their travel and stop means on said body rendering said counterweight means ineffective after a predetermined partial radially inward movement of said tool block has occurred.

2. A machining head as set forth in claim 1, said connection including a lost motion clearance accommodating continued radially inward movement of each tool block after said counterweight means has engaged said stop means.

3. A machining head as set forth in claim 1, said stop means including adjustment means for varying the effective radial position of said counterweight means at which its movement is arrested.

4. A machining head as set forth in claim 1 including resilient means for cushioning the effective resistance of said stop.

5. A machining cross-feed head comprising;

a rotary body, parallel cross slide means on opposite sides of rotational center of said body, each with a tool block for mounting a cutting tool, means for simultaneously feeding said tool blocks radially across said body including a single axial draw bar with linkage to said tool block slides and crank elements having pivotal axles seated in said body and individual counterweight means having a connection with each tool block cross slide operative to reduce the effective centrifugal force on said tool blocks through at least a portion of their travel.

6. A machining cross-feed head comprising;

a rotary body, parallel transverse slide-ways extending across the face of said rotary body, each including a slide for mounting a tool block on the outer face of said rotary body and an inwardly extending slide drive projection, a tool block for mounting a cutting tool on each slide, means for simultaneously feeding said tool blocks radially across said body, individual counterweight means having a connection with each tool block cross slide operative to reduce the effective centrifugal force on said tool blocks through at least a portion of their travel, a guide slot for said counterweight means located inwardly of said slide, and a lost motion connection between said slide and said counterweight means.

7. A machining head as set forth in claim 6 wherein said lost motion connection comprises a slot in said slide and a projection from said counterweight engaging said slot.

* * * * *